US010814229B2

(12) United States Patent
Quan et al.

(10) Patent No.: US 10,814,229 B2
(45) Date of Patent: *Oct. 27, 2020

(54) FRAGMENT-BASED MOBILE DEVICE APPLICATION STREAMING UTILIZING CROWD-SOURCING

(71) Applicant: RAZER (ASIA-PACIFIC) PTE. LTD., Singapore (SG)

(72) Inventors: Justin Quan, San Francisco, CA (US); Michael A. Chan, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 282 days.

This patent is subject to a terminal disclaimer.

(21) Appl. No.: 15/653,701

(22) Filed: Jul. 19, 2017

(65) Prior Publication Data

US 2017/0312630 A1 Nov. 2, 2017

Related U.S. Application Data

(60) Division of application No. 14/251,463, filed on Apr. 11, 2014, now Pat. No. 9,717,985, which is a
(Continued)

(51) Int. Cl.
*H04L 29/04* (2006.01)
*H04L 29/06* (2006.01)
(Continued)

(52) U.S. Cl.
CPC .............. *A63F 13/52* (2014.09); *A63F 13/10* (2013.01); *A63F 13/12* (2013.01); *A63F 13/215* (2014.09);
(Continued)

(58) Field of Classification Search
USPC .............................. 705/34; 707/703; 709/223
See application file for complete search history.

(56) References Cited

U.S. PATENT DOCUMENTS

| 6,811,486 B1 | 11/2004 | Luciano, Jr. |
| 7,315,740 B2 | 1/2008 | Maes |
| (Continued) | | |

FOREIGN PATENT DOCUMENTS

EP 2 680 207 A1 1/2014

OTHER PUBLICATIONS

U.S. Appl. No. 13/772,163 by Quan, J., filed Feb. 20, 2013.
(Continued)

*Primary Examiner* — Fahd A Obeid
*Assistant Examiner* — Reva R Moore
(74) *Attorney, Agent, or Firm* — Mattingly & Malur PC

(57) ABSTRACT

Some examples include decomposing an application into fragments and streaming the application in fragments. For instance, a plurality of application fragments may include a first application fragment and a second application fragment that each correspond to a portion of a mobile game application. When streaming the first application fragment to the mobile device, a system may determine that the second application fragment follows the first application fragment based on a fragments relationship data structure. The fragments relationship data structure may associate the first application fragment with the second application fragment based on an analysis of the fragment information that indicates that the second application fragment follows the first application fragment during operation of the mobile game application. The system may stream the second application fragment to the mobile device based on the determination that the second application fragment follows the first application fragment.

13 Claims, 6 Drawing Sheets

Related U.S. Application Data continuation-in-part of application No. 14/160,444, filed on Jan. 21, 2014, now Pat. No. 8,892,693, which is a continuation-in-part of application No. 13/865,515, filed on Apr. 18, 2013, now Pat. No. 9,374,407.

(60) Provisional application No. 61/708,794, filed on Oct. 2, 2012.

(51) Int. Cl.
| | |
|---|---|
| A63F 13/52 | (2014.01) |
| A63F 13/30 | (2014.01) |
| G06F 9/50 | (2006.01) |
| A63F 13/40 | (2014.01) |
| A63F 13/60 | (2014.01) |
| A63F 13/358 | (2014.01) |
| A63F 13/77 | (2014.01) |
| A63F 13/215 | (2014.01) |
| A63F 13/61 | (2014.01) |
| A63F 13/34 | (2014.01) |
| H04L 29/02 | (2006.01) |

(52) U.S. Cl.
CPC ........... *A63F 13/34* (2014.09); *A63F 13/358* (2014.09); *A63F 13/60* (2014.09); *A63F 13/61* (2014.09); *A63F 13/77* (2014.09); *G06F 9/5072* (2013.01); *H04L 65/4084* (2013.01); *H04L 65/602* (2013.01); *A63F 2300/538* (2013.01); *G06F 2209/5017* (2013.01)

(56) References Cited

U.S. PATENT DOCUMENTS

| | | |
|---|---|---|
| 7,326,117 B1 | 2/2008 | Best |
| 7,490,045 B1 | 2/2009 | Flores et al. |
| D611,494 S | 3/2010 | Akiyoshi et al. |
| 7,774,457 B1 | 8/2010 | Talwar et al. |
| 7,903,383 B2 | 3/2011 | Fukano et al. |
| 8,005,956 B2 | 8/2011 | Williams et al. |
| D646,695 S | 10/2011 | Hoggarth et al. |
| 8,234,348 B1 | 7/2012 | Tulchinsky et al. |
| 8,290,920 B2 * | 10/2012 | Mahajan ............... G06F 16/27 707/703 |
| 8,315,977 B2 | 11/2012 | Anand et al. |
| 8,423,511 B1 | 4/2013 | Bhatia |
| D682,874 S | 5/2013 | Frijlink et al. |
| 8,438,298 B2 | 5/2013 | Arai et al. |
| D683,737 S | 6/2013 | Brinda et al. |
| 8,473,577 B2 | 6/2013 | Chan |
| 8,475,275 B2 | 7/2013 | Weston et al. |
| 8,478,816 B2 | 7/2013 | Parks et al. |
| 8,494,576 B1 | 7/2013 | Bye et al. |
| 8,495,129 B2 | 7/2013 | Wolman et al. |
| 8,515,902 B2 | 8/2013 | Savage |
| D689,505 S | 9/2013 | Convay et al. |
| 8,539,567 B1 | 9/2013 | Logue et al. |
| 8,577,292 B2 | 11/2013 | Huibers |
| 8,589,140 B1 | 11/2013 | Poulin |
| 8,606,948 B2 | 12/2013 | Evans et al. |
| 8,666,938 B1 | 3/2014 | Pancholy |
| 8,747,232 B1 | 6/2014 | Quan et al. |
| 8,764,555 B2 | 7/2014 | Quan et al. |
| 8,775,449 B2 | 7/2014 | Quan et al. |
| D710,878 S | 8/2014 | Jung |
| 8,812,601 B2 | 8/2014 | Hsieh et al. |
| 8,840,461 B2 | 9/2014 | Quan et al. |
| 8,868,859 B2 | 10/2014 | Schmidt et al. |
| D718,334 S | 11/2014 | Cranfill |
| 8,913,056 B2 | 12/2014 | Zimmer et al. |
| D726,753 S | 4/2015 | Angelides |
| D730,383 S | 5/2015 | Brinda et al. |
| D731,537 S | 6/2015 | Jeong et al. |
| D732,549 S | 6/2015 | Kim |
| D734,775 S | 7/2015 | Nagasawa et al. |
| D736,822 S | 8/2015 | Tursi et al. |
| D737,852 S | 9/2015 | De La Rosa et al. |
| 9,274,780 B1 | 3/2016 | Velummylum et al. |
| 2001/0039212 A1 | 11/2001 | Sawano et al. |
| 2002/0161908 A1 | 10/2002 | Benitez et al. |
| 2003/0069037 A1 | 4/2003 | Kiyomoto et al. |
| 2003/0078959 A1 | 4/2003 | Yeung et al. |
| 2004/0018876 A1 | 1/2004 | Kubota et al. |
| 2004/0121837 A1 | 6/2004 | Chiang et al. |
| 2004/0203381 A1 | 10/2004 | Cahn et al. |
| 2005/0147130 A1 | 7/2005 | Hurwitz et al. |
| 2006/0030408 A1 | 2/2006 | Kiiskinen |
| 2006/0073788 A1 | 4/2006 | Halkka et al. |
| 2007/0130217 A1 | 6/2007 | Linyard et al. |
| 2008/0220878 A1 | 2/2008 | Michaelis et al. |
| 2008/0055311 A1 | 3/2008 | Aleksic et al. |
| 2008/0201705 A1 | 8/2008 | Wookey |
| 2009/0063690 A1 | 3/2009 | Verthein et al. |
| 2009/0077263 A1 | 3/2009 | Koganti et al. |
| 2009/0106110 A1 | 4/2009 | Stannard et al. |
| 2009/0204966 A1 | 8/2009 | Johnson et al. |
| 2009/0282125 A1 | 11/2009 | Jeide et al. |
| 2010/0173712 A1 | 7/2010 | Buhr et al. |
| 2010/0235511 A1 | 9/2010 | Kai |
| 2010/0257403 A1 | 10/2010 | Virk et al. |
| 2010/0332401 A1 | 12/2010 | Prahlad et al. |
| 2011/0076941 A1 | 3/2011 | Taveau et al. |
| 2011/0078319 A1 | 3/2011 | Ishida |
| 2011/0093567 A1 | 4/2011 | Jeon et al. |
| 2011/0106755 A1 | 5/2011 | Hao et al. |
| 2011/0128168 A1 | 5/2011 | Ilyayev |
| 2011/0219105 A1 | 9/2011 | Kryze et al. |
| 2011/0252071 A1 | 10/2011 | Cidon |
| 2011/0275316 A1 | 11/2011 | Suumäki et al. |
| 2011/0286026 A1 | 11/2011 | Matsuzawa |
| 2011/0313922 A1 | 12/2011 | Ben Ayed |
| 2012/0017236 A1 | 1/2012 | Stafford et al. |
| 2012/0023250 A1 | 1/2012 | Chen et al. |
| 2012/0028714 A1 | 2/2012 | Gagner et al. |
| 2012/0036218 A1 | 2/2012 | Oh et al. |
| 2012/0036239 A1 | 2/2012 | Donaghey et al. |
| 2012/0064908 A1 | 3/2012 | Fox et al. |
| 2012/0079095 A1 | 3/2012 | Evans et al. |
| 2012/0079126 A1 | 3/2012 | Evans et al. |
| 2012/0084803 A1 | 4/2012 | Johansson et al. |
| 2012/0110568 A1 | 5/2012 | Abel et al. |
| 2012/0128172 A1 | 5/2012 | Alden |
| 2012/0149309 A1 | 6/2012 | Hubner et al. |
| 2012/0171951 A1 | 7/2012 | 't Hooft |
| 2012/0203932 A1 | 8/2012 | da Costa et al. |
| 2012/0210343 A1 | 8/2012 | McCoy et al. |
| 2012/0278225 A1 | 11/2012 | Ahiska et al. |
| 2012/0290717 A1 | 11/2012 | Luna |
| 2012/0303778 A1 * | 11/2012 | Ahiska ............... A63F 13/60 709/223 |
| 2012/0311820 A1 | 12/2012 | Chang |
| 2013/0007203 A1 | 1/2013 | Zsu |
| 2013/0008611 A1 | 1/2013 | Marcus et al. |
| 2013/0038618 A1 * | 2/2013 | Urbach ............... G06T 15/06 345/522 |
| 2013/0044106 A1 | 2/2013 | Shuster et al. |
| 2013/0045795 A1 | 2/2013 | Fiedler |
| 2013/0080964 A1 | 3/2013 | Shigeta |
| 2013/0086114 A1 | 4/2013 | Wilson et al. |
| 2013/0117806 A1 | 5/2013 | Parthasarathy et al. |
| 2013/0159890 A1 | 6/2013 | Rossi |
| 2013/0219381 A1 | 8/2013 | Lovitt |
| 2013/0223240 A1 | 8/2013 | Hayes et al. |
| 2013/0225087 A1 | 8/2013 | Uhm |
| 2013/0304898 A1 | 11/2013 | Aggarwal et al. |
| 2013/0339058 A1 | 12/2013 | Gotlib et al. |
| 2014/0040239 A1 | 2/2014 | Hirsch et al. |
| 2014/0053054 A1 | 2/2014 | Shen et al. |
| 2014/0101300 A1 | 4/2014 | Rosensweig et al. |
| 2014/0170978 A1 | 6/2014 | Wolman et al. |
| 2014/0215030 A1 | 7/2014 | Terwilliger et al. |
| 2014/0245203 A1 | 8/2014 | Lee et al. |
| 2014/0379853 A1 | 12/2014 | Shelton |

(56) References Cited

U.S. PATENT DOCUMENTS

| | | |
|---|---|---|
| 2015/0286388 A1 | 10/2015 | Jeon et al. |
| 2015/0326655 A1 | 11/2015 | Quan et al. |
| 2015/0365463 A1 | 12/2015 | Quan et al. |
| 2015/0365817 A1 | 12/2015 | Chu et al. |
| 2015/0367238 A1 | 12/2015 | Perrin et al. |
| 2015/0370428 A1 | 12/2015 | Chan et al. |
| 2015/0373107 A1 | 12/2015 | Chan et al. |

OTHER PUBLICATIONS

U.S. Appl. No. 14/043,034 by Chan, M.A.; et al., filed Oct. 1, 2013.
U.S. Appl. No. 14/158,682 by Quan, J., et al., filed Jan. 17, 2004.
U.S. Appl. No. 14/179,709 by Quan, J., et al., filed Feb. 13, 2014.
U.S. Appl. No. 14/158,715 by Quan, J., et al., filed Jan. 17, 2014.
U.S. Appl. No. 14/173,680 by Quan, J., et al., filed Feb. 5, 2014.
U.S. Appl. No. 14/167,834 by Quan, J., et al., filed Jan. 29, 2014.
U.S. Appl. No. 14/179,744 by Quan, J., et al., filed Feb. 13, 2014.
U.S. Appl. No. 14/158,733 by Quan, J., et al., filed Jan. 17, 2014.
U.S. Appl. No. 14/167,939 by Quan, J., et al., filed Jan. 29, 2014.
U.S. Appl. No. 14/228,190 by Quan, J., et al., filed Mar. 27, 2014.
U.S. Appl. No. 14/042,567 by Chan, M.A., et al., filed Sep. 30, 2013.
U.S. Appl. No. 14/042,509 by Chan, M.A., et al., filed Sep. 30, 2013.
U.S. Appl. No. 14/042,398 by Chan, M.A., et al., filed Sep. 30, 2013.
U.S. Appl. No. 29/486,424 by Chan, M.A., et al., filed Mar. 28, 2014.
International Search Report and Written Opinion dated Feb. 3, 2014, 7 pp., for International Application No. PCT/US13/62729 filed Sep. 30, 2013.
International Search Report and Written Opinion dated Feb. 3, 2014, 9 pp., for International Application No. PCT/US13/62986 filed Oct. 2, 2013.
International Search Report and Written Opinion dated Feb. 3, 2014, 7 pp., for International Application No. PCT/2013/62737 filed Sep. 30, 2013.
Non-Final Office Action dated Apr. 3, 2014, U.S. Appl. No. 14/158,682 by Quan, J., et al., filed Jan. 17, 2004.
Non-Final Office Action dated Apr. 2, 2014, U.S. Appl. No. 14/179,709 by Quan, J., et al., filed Feb. 13, 2014.
Non-Final Office Action dated Mar. 7, 2014, Co-pending U.S. Appl. No. 14/158,715, by Quan et al., filed Jan. 17, 2014.
Non-Final Office Action dated Mar. 10, 2014, Co-pending U.S. Appl. No. 14/173,680, by Quan et al., filed Feb. 5, 2014.
Kevin, "Android Automatic App Updates Part 2," Worldstart's Tech Tips And Computer Help, dated Apr. 10, 2012, Retrieved from the Internet URL: http://www.worldstart.com/android-automatic-app-updates-part-2/, retrieved on Oct. 22, 2015, pp. 1-3.
Khan, S., "ZDBox For Android Is All-In-One Toolkit To Monitor And Manage Device," dated Mar. 4, 2011, Retrieved from the Internet URL: http://www.addictivetips.com/mobile/zdbox-for-android-is-all-in-one-toolkit-to-monitor-and-manage-device/, retrieved on Oct. 27, 2015, pp. 1-6.
Nickinson, P., "Add a signature in gmail," Android Central, dated Nov. 29, 2010, Retrieved from the Internet URL: http://www.androidcentral.com/add-signature-gmail, retrieved on Oct. 26, 2015, pp. 1-10.
Non-Final Office Action dated May 15, 2015, for U.S. Appl. No. 14/042,398, by Chan, M.A., et al., filed Sep. 30, 2013.
Non-Final Office Action dated Jun. 22, 2015, for U.S. Appl. No. 14/043,034, of Quan, J., et al., filed Oct. 1, 2013.
Non-Final Office Action dated Jun. 22, 2015, for U.S. Appl. No. 14/158,682, of Quan, J., et al., filed Jan. 17, 2014.
Non-Final Office Action dated Jul. 20, 2015, for U.S. Appl. No. 14/042,509, of Chan, M.A., et al., filed Sep. 30, 2013.
Notice of Allowance dated Jul. 24, 2015, for U.S. Appl. No. 14/158,733, of Quan, J., et al., filed Jan. 17, 2014.
Non-Final Office Action dated Aug. 21, 2015, for U.S. Appl. No. 14/042,567, of Chan, M.A., et al., filed Sep. 30, 2013.
Notice of Allowance dated Sep. 2, 2015, for U.S. Appl. No. 14/042,398 of Chan, M.A., et al., filed Sep. 30, 2013.
Notice of Allowance dated Oct. 2, 2015, for U.S. Appl. No. 14/228,190, of Quan, J., et al., filed Mar. 27, 2014.
Notice of Allowance dated Oct. 7, 2015, for U.S. Appl. No. 13/865,515, of Quan, J., et al., filed Apr. 18, 2013.
Notice of Allowance dated Nov. 4, 2015, for U.S. Appl. No. 14/158,733, of Quan, J., et al., filed Jan. 17, 2014.
Ex Parte Quayle Action mailed Dec. 3, 2015, for U.S. Appl. No. 29/486,424, of Chan, M. A., et al., filed Mar. 28, 2014.
Notice of Allowance dated Jan. 11, 2016, for U.S. Appl. No. 14/042,398, of Chan, M.A., et al., filed Sep. 30, 2013.
Notice of Allowance dated Feb. 12, 2016, for U.S. Appl. No. 13/865,515, of Quan, J., et al., filed Apr. 18, 2013.
Notice of Allowance dated Feb. 12, 2016, for U.S. Appl. No. 14/228,190, of Quan, J., et al., filed Mar. 27, 2014.
Final Office Action dated Feb. 26, 2016, for U.S. Appl. No. 14/042,509, of Chan, M.A., et al., filed Sep. 30, 2013.
Final Office Action dated Feb. 29, 2016, for U.S. Appl. No. 14/043,034, of Quan, J., et al., filed Oct. 1, 2013.
Non-Final Office Action dated Jun. 8, 2016, for U.S. Appl. No. 14/840,636, of Chan, M.A., et al., filed Aug. 31, 2015.
Non-Final Office Action dated Jun. 8, 2016, for U.S. Appl. No. 14/840,611, of Chan, M.A., et al., filed Aug. 31, 2015.
Final Office Action dated Jun. 17, 2016, for U.S. Appl. No. 14/042,567, of Chan, M.A., et al., filed Sep. 30, 2013.
Notice of Allowance dated Aug. 3, 2016, for U.S. Appl. No. 29/486,424, of Chan, M.A., et al., filed Mar. 28, 2014.
Non-Final Office Action dated Aug. 12, 2016, for U.S. Appl. No. 14/221,174, of Chan, M.A., et al., filed Mar. 20, 2014.
McCormick, Z. and Schmidt, D. C., "Data Synchronization Patterns in Mobile Application Design," Vanderbilt University, pp. 1-14 (2012).
Notice of Allowance dated Oct. 29, 2014, for U.S. Appl. No. 14/167,939 by Quan, J., et al., filed Jan. 29, 2014.
Notice of Allowance dated Oct. 29, 2014, for U.S. Appl. No. 14/179,744 by Quan, J., et al., filed Feb. 13, 2014.
Notice of Allowance dated Nov. 25, 2014, for U.S. Appl. No. 14/252,674 by Chan, M.A., et al., filed Apr. 14, 2014.
Notice of Allowance dated Dec. 4, 2014, for U.S. Appl. No. 14/479,140 by Chan, M.A., et al., filed Sep. 5, 2014.
Notice of Allowance dated Dec. 12, 2014, for U.S. Appl. No. 14/479,140 by Chan, M.A., et al., filed Sep. 5, 2014.
Notice of Allowance dated Dec. 17, 2014, for U.S. Appl. No. 14/267,823 by Chan, M.A., et al., filed May 1, 2014.
Notice of Allowance dated Dec. 19, 2014, for U.S. Appl. No. 14/479,140 by Chan, M.A., et al., filed Sep. 5, 2014.
Notice of Allowance dated Dec. 22, 2014, for U.S. Appl. No. 14/179,744 by Quan, J., et al., filed Feb. 13, 2014.
Final Office Action dated Dec. 23, 2014, for U.S. Appl. No. 14/158,733 by Quan, J., et al., filed Jan. 17, 2014.
Notice of Allowance dated Mar. 17, 2015, for U.S. Appl. No. 14/158,733, Quan, J., et al., filed on Jan. 17, 2014.
Notice of Allowance dated Mar. 30, 2015, for U.S. Appl. No. 13/772,163, Quan, J., filed on Feb. 20, 2013.
Notice of Allowance dated Mar. 30, 2015, for U.S. Appl. No. 14/267,823, Chan, M.A., et al., filed on May 1, 2014.
Non-Final Office Action dated Apr. 8, 2015, for U.S. Appl. No. 13/865,515, Quan, J., et al., filed on Apr. 18, 2013.
Non-Final Office Action dated Apr. 8, 2015, for U.S. Appl. No. 14/228,190, Quan, J., et al., filed on Mar. 27, 2014.
Notice of Allowance dated Apr. 15, 2015, for U.S. Appl. No. 14/479,140, Chan, M.A., et al., filed on Sep. 5, 2014.
Final Office Action dated Jul. 24, 2014, U.S. Appl. No. 14/179,709 by Quan, J., et al., filed Feb. 13, 2014.
Final Office Action dated Nov. 6, 2014, U.S. Appl. No. 14/158,682 by Quan, J., et al., filed Jan. 17, 2004.
International Search Report dated Sep. 11, 2014, 7 pps., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.

(56) References Cited

OTHER PUBLICATIONS

Non Final Office Action dated Nov. 3, 2014, for U.S. Appl. No. 13/772,163 by Quan, J., filed Feb. 20, 2013.
Non Final Office Action dated Oct. 23, 2014, for U.S. Appl. No. 14/252,674 by Chan, M.A., et al., filed Apr. 14, 2014.
Non-Final Office Action dated Aug. 26, 2014, for U.S. Appl. No. 14/267,823 by Chan, M.A., et al., filed May 1, 2014.
Non-Final Office Action dated Jun. 9, 2014, for U.S. Appl. No. 14/167,939 by Quan, J., et al., filed Jan. 29, 2014.
Notice of Allowance dated Aug. 12, 2014, U.S. Appl. No. 14/179,709 by Quan, J., et al., filed Feb. 13, 2014.
Notice of Allowance dated Sep. 3, 2014, U.S. Appl. No. 14/160,444 by Quan, J., et al., filed Jan. 21, 2014.
Restriction Requirement dated Aug. 29, 2014, for U.S. Appl. No. 14/252,674 by Chan, M.A., et al., filed Apr. 14, 2014.
U.S. Appl. No. 14/479,087 by Chan, M.A et al., filed Sep. 5, 2014.
U.S. Appl. No. 14/479,140 by Chan, M.A et al., filed Sep. 5, 2014.
Notice of Allowance dated May 20, 2014, Co-pending U.S. Appl. No. 14/173,680, by Quan et al., filed Feb. 5, 2014.
Non-Final Office Action dated May 27, 2014, U.S. Appl. No. 14/158,733 by Quan, J., et al., filed Jan. 17, 2014.
Notice of Allowance dated May 14, 2014, Co-pending U.S. Appl. No. 14/158,716, by Quan et al., filed Jan. 17, 2014.
Non-Final Office Action dated May 8, 2014, U.S. Appl. No. 14/179,744 by Quan, J., et al., filed Feb. 13, 2014.
Non-Final Office Action dated May 9, 2014, U.S. Appl. No. 14/160,444 by Quan, J., et al., filed Jan. 21, 2014.
Co-Pending U.S. Appl. No. 14/267,823 by Chan, M.A., et al., filed May 1, 2014.
Co-Pending U.S. Appl. No. 14/221,174 by Chan, M.A., et al., filed Mar. 20, 2014.
Co-Pending U.S. Appl. No. 14/252,674 by Chan, M.A., et al., filed Apr. 14, 2014.
Notice of Allowance dated Apr. 15, 2014, Co-pending U.S. Appl. No. 14/167,834, by Quan et al., filed Jan. 29, 2014.

* cited by examiner

FRAGMENT-BASED MOBILE DEVICE APPLICATION STREAMING UTILIZING CROWD-SOURCING

CROSS-REFERENCED TO RELATED APPLICATIONS

This application is a divisional application of U.S. patent application Ser. No. 14/251,463, entitled FRAGMENT-BASED MOBILE DEVICE APPLICATION STREAMING UTILIZING CROWD-SOURCING, filed Apr. 11, 2014, which is a continuation-in-part of U.S. patent application Ser. No. 14/160,444, entitled "ENABLING FRAGMENT-BASED MOBILE DEVICE APPLICATION STREAMING", filed Jan. 21, 2014, now U.S. Pat. No. 8,892,693, which is a continuation-in-part of U.S. patent application Ser. No. 13/865,515, entitled "MOBILE DEVICE APPLICATION STREAMING", filed on Apr. 18, 2013, now U.S. Pat. No. 9,374,407, which claims the benefit of U.S. Provisional Patent Application No. 61/708,794, entitled "CLOUD COMPUTING INTEGRATED OPERATING SYSTEM", filed on Oct. 2, 2012, all of which are incorporated by reference herein in their entirety.

FIELD OF THE INVENTION

At least one embodiment of the present invention pertains to mobile device applications, and more particularly, to streaming of mobile applications designed to run on mobile devices.

BACKGROUND

In recent years, the use of wireless networks to distribute content within a service area thereof has become increasingly common. For example, a mobile device within range of a base station of a third generation (3G) or fourth generation (4G) cellular network is capable of "pulling content" from a remote server, for example, a content server, coupled to the base station. A mobile device can download a mobile application from an application distribution platform via a wireless network such as a WiFi or cellular network. Even with the increasing network speed of the modern WiFi and cellar networks, it can still take a significant time to download a large mobile application. A user of the mobile device has to wait for the download to be finished before the user can start installing and running the mobile application on the mobile device. Even for a user only wants to try a small percentage of the functionalities or stages of a mobile application, the user still need to download the whole application before the user can try any portion of the application.

Furthermore, a modern application can include a large amount multimedia content and can have a size of several gigabytes (GBs). A user of a mobile device may find that the mobile device does not have enough available storage space to accommodate the application. Therefore, the user may be forced to delete some of the existing applications or files stored on the mobile device, in order to run the application.

SUMMARY

Technology introduced here provides a mechanism to enable a user to run an application on a computing device before the whole application has been downloaded to the computing device. A processing server can decompose an application into a plurality of fragments. Each fragment of the application corresponds to one or more user interfaces, such as activities in an Android environment or views in an iOS environment. Resources are determined for each user interface. Resources, e.g. images, texts, videos, audios, 3D models, necessary for a specific user interface are included within a corresponding fragment. The dependency relationships between the fragments are also determined.

An application can be launched on a computing device by streaming one of more fragments of the application to the computing device, or by running one or more fragments of the application at the computing device. Fragments are streamed to and cached on the computing device based on the dependency of the fragments. For example, assuming fragments 5 and 6 can be only accessed via fragment 4, if the user is currently active on fragment 4, then fragments 5 and 6 may be prioritized for streaming to the computing device. A server can further determine the probability of each fragment being used based on other users' access patterns.

The application can be decomposed into fragments using a full server processing method. For example, a processing server can run an emulator to execute the application and determine the user interfaces and resources for each fragment of the application. The application can also be decomposed into fragments using a crowd sources device processing. Computing devices that have the full application stored locally can run the application and determine the user interfaces and resources for each fragment of the application. Then the fragmenting information can be updated to a server so that the server can decompose the application on the server accordingly.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
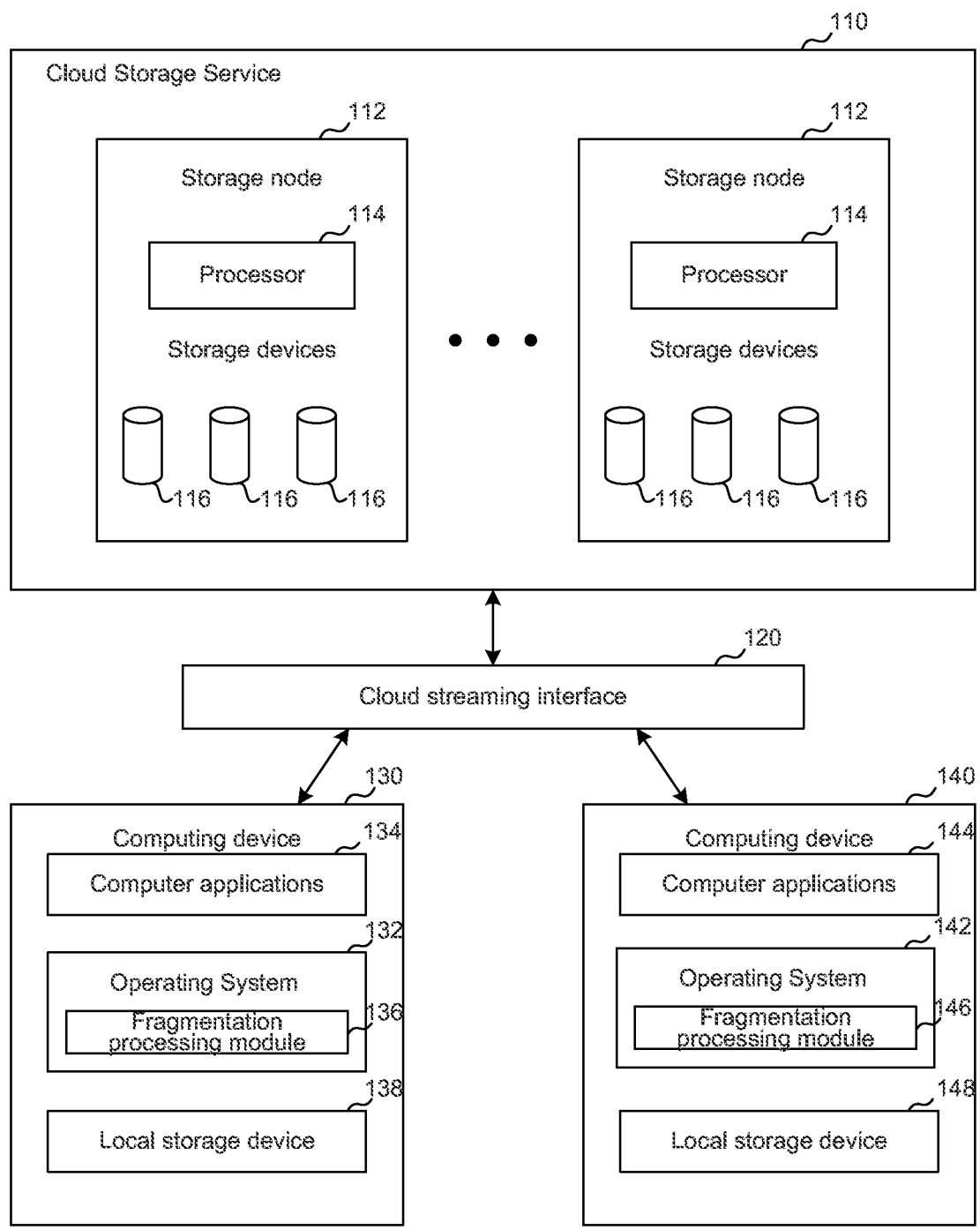
FIG. 1 illustrates an example system for streaming applications to computing devices.

FIG. 1 illustrates an example system for streaming applications computing devices. The system includes a cloud storage service 110 configured to store applications and determine fragmentation of the applications. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud streaming interface 120 can also be included to stream fragments of applications from the cloud storage service to the computing device. The cloud streaming interface 120 can include network communication hardware and network connection logic to receive the information from computing devices. The network can be a local area network (LAN), wide area network (WAN) or the Internet. The cloud streaming interface 120 may include a queuing mechanism to organize fragments to be streamed to the computing devices. The cloud streaming interface 120 can communicate with the cloud storage service 110 to send requests to the cloud storage service 110 for requesting fragments of the applications.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can backup application states of the computer applications 134 to the cloud storage service 110. The computing device 130 includes at least one local storage device 138 to store the computer applications, application fragments, and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a fragmentation processing module 136 to process the application fragments streamed from the cloud storage server 110. Similarly, another computing device 140 can also retrieve application fragments from the cloud storage service 110.

Figure 2:
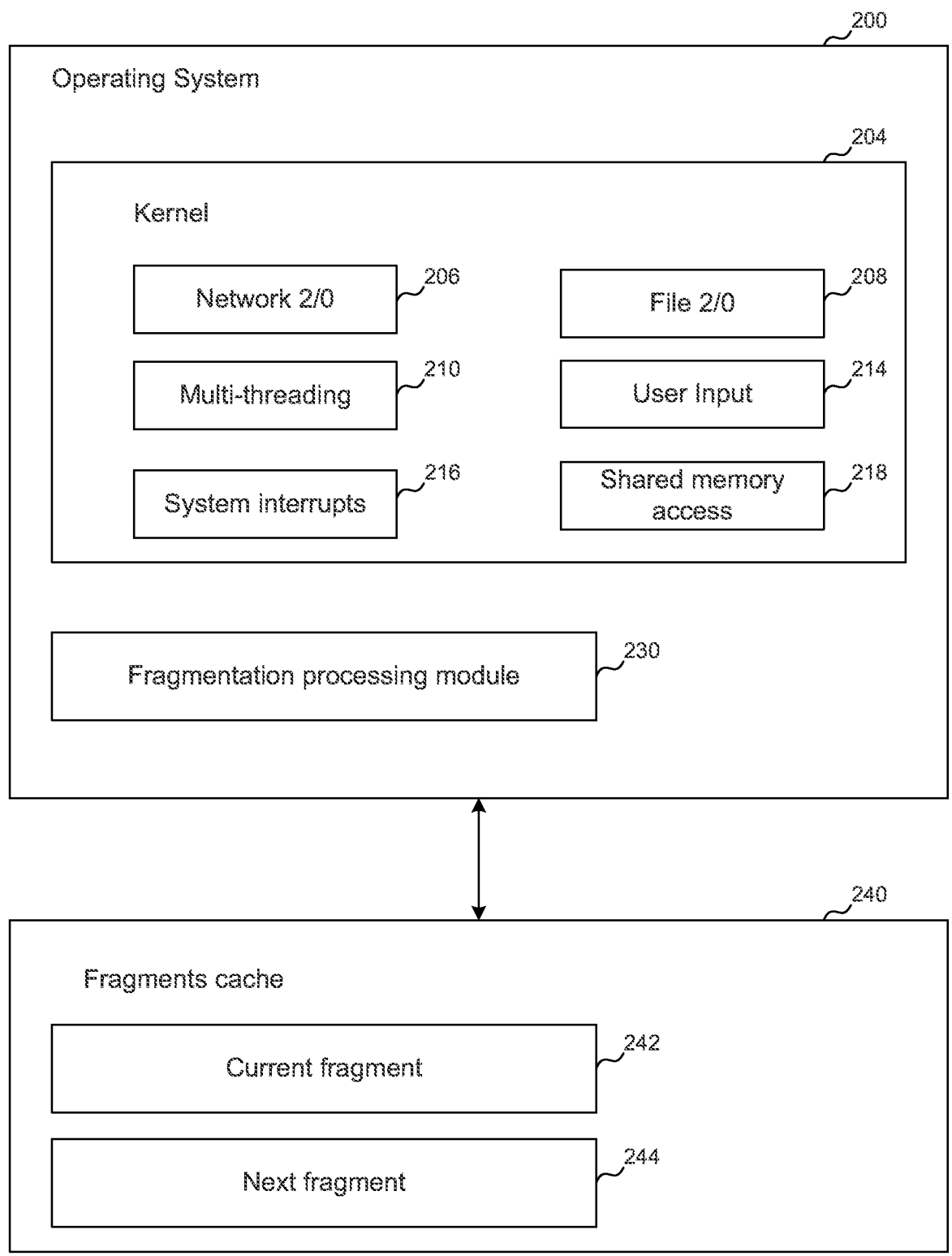
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A fragmentation processing module 230 runs on top of the kernel 204. The fragmentation processing module 230 processes the application fragments retrieved from the cloud storage service and runs the application as that the entire application has been stored in the computing device. In the example of FIG. 2, a fragments cache 240 includes a current fragment 242 that currently run on top of the operating system 300. The fragments cache 240 can further include a next fragment 244 that is ready to start seamlessly after the current fragment 242.

Figure 3:
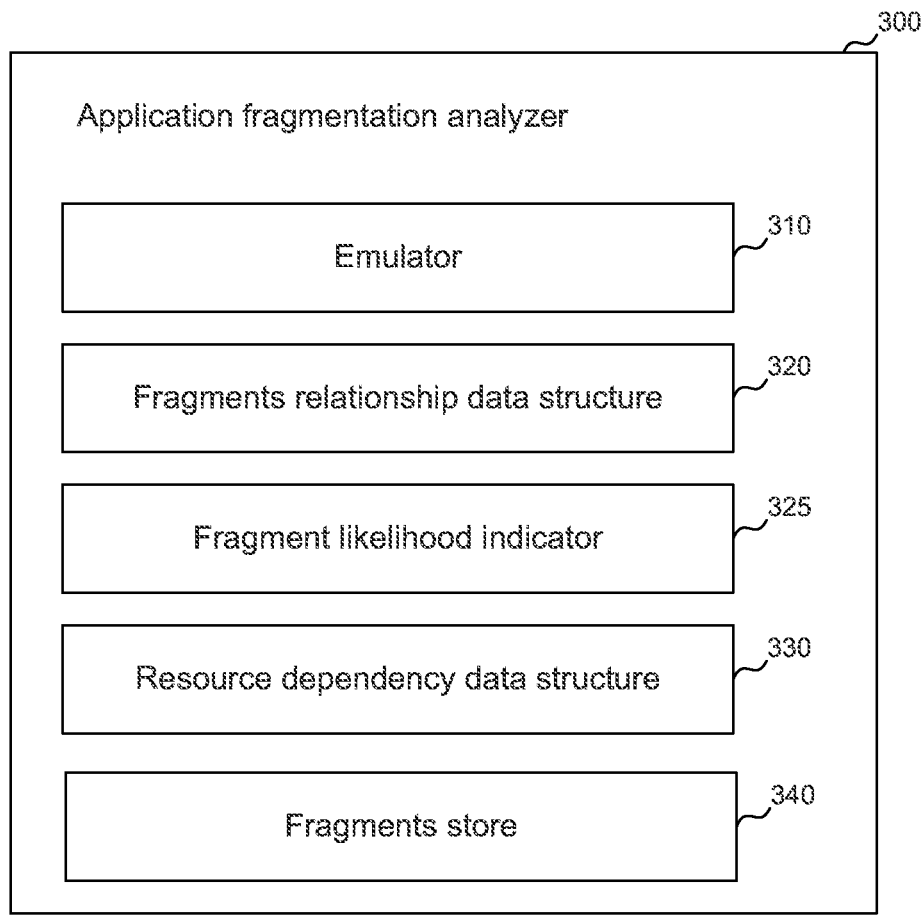
FIG. 3 illustrates an example of an application fragmentation analyzer.

FIG. 3 illustrates an example of an application fragmentation analyzer. The process 300 can be performed by a server or a computing device as part of crowd sourced processing. For example, the process 300 can include sending one or more messages to initiate a process that crowd sources any of the steps of FIG. 3. Crowd sourcing a task can involve, for example, a server sending one or more messages to a crowd source server. A crowd source server can manage sending/distributing compute jobs that are part of a crowd sourced task to multiple computing devices. The computing devices can be freely made available to use to execute crowd sourced tasks by a group of people. When computing devices are made freely available, the people making the computing devices available receive no financial compensation from the submitter of a crowd sourced task in association with their computing device(s) being used to execute the crowd sourced task.

The message(s) sent to initiate the crowd sourced task cause or prompt the crowd source server to identify computing devices that can be used to execute the task. The same message(s), or a different message or set of messages sent by the server, can cause the crowd source server to send/distribute the compute jobs that are part of the task to some or all of the identified computing systems. In other words, the message(s) that initiate the crowd sourced task can also cause the crowd source server to identify the computing devices, and can also cause the crowd source server to send/distribute the computer jobs that are part of the task to some or all of the identified computing systems. When a task is initiated, the crowd source server sends message(s) to any of the various computing devices that were identified to cause a compute job that is part of the task to be executed on the computing device. In some embodiments, the server performs the tasks above in place of a crowd source server. In some embodiments, the computing devices that are used to execute the task can include computing devices of the submitter of the task, or computing devices for which the task submitter pays to use to execute compute jobs that are part of the task.

The application fragmentation analyzer of FIG. 3 can be used by a storage server or a cloud storage service, such as the cloud storage service 110 as illustrated in FIG. 1. For example, the application fragmentation analyzer can run on the cloud storage service 110 to decompose an application into fragments. As illustrated in FIG. 3, the application fragmentation analyzer 300 includes an emulator 310 to execute the application determine the user interfaces and resources for each fragment of the application. The emulator 310 simulates an environment as a computing device on which the application runs.

By running the application on the emulator 310, the application fragmentation analyzer 300 can determine a plurality of fragments of the application. Each fragment corresponds to one or more user interfaces of the application. In an embodiment, the fragment is determined by determining the resources required to run and/or display at least one user interface. In an embodiment, a user interface is a related portion of an application. As a first example, video games frequently contain levels, and users by completing tasks or taking certain actions advance to a next level. One user interface corresponds to a first level of the video game, and the application fragment includes the resources required to run and/or display the first level. A second user interface corresponds to a second level of the video game, and the application fragment includes the resources required to run and/or display the second level. While playing the video game in the first level, the first application fragment is being run. In response to the user advancing to the second level, the second application fragment is run.

As another example, a first user interface corresponds to a first scene in the video game, and a second user interface corresponds to a second scene. The first scene takes place in a virtual geography local to an island, and the second scene takes place in a virtual geography local to a cave. One application fragment includes the resources to run and/or display the virtual geography local to the island, and a second application fragment includes the resources to run and/or display the virtual geography local to the cave. In response to the scene transitioning from the island to the cave, the second application fragment is run.

As another example, a first user interface corresponds to a first level of a video game, and a second user interface corresponds to a help portion of the video game. The second application fragment includes the resources needed to run and/or display a help system. In response to a user indicating a need for help while in the first level, such as by clicking a help button, the second application fragment is run.

As another example, a first user interface corresponds to a first activity in a productivity application and a second user interface corresponds to a second activity in the productivity application. The productivity application is Excel, and the first activity is entering data into a worksheet. The second activity is generating and displaying graphs based on the data. The first application fragment includes the resources to run and/or display the interface used by the user to enter the data, and the second application fragment includes the resources to run and/or display the interface used by the user to generate and view the graphs. In response to the user indicating a desire to generate a graph, such as by selecting a graph generation menu item, the second application fragment is run.

As another example, a first graphics module of a video game corresponds to a first application fragment that includes among other resources the resources required to run and/or display the first graphics module. A second graphics module corresponds to a second application fragment that includes among other resources the resources required to run and/or display the second graphics module. A first user interface corresponds to the first application fragment, and the other resources for the first application fragment can include resources for other graphics modules, for other portions of the first user interface, and the like. A second and a third user interface correspond to the second application fragment, and the other resources for the second application fragment can include resources for other graphics modules, for other portions of the second and/or the third user interfaces, and the like As additional examples, for an Android application, a user interface can include an activity of the Android application. For an iOS application, a user interface can include a view of the iOS application. For a HTML5 application, a user interface can include a page of the HTML5 application.

Once the fragments are determined, the application fragmentation analyzer 300 further generates a fragments relationship data structure 320 based on an analysis of the fragments that determines which fragments can lead ("link") to another fragment during operation of the application. The fragments relationship data structure 320 includes the information whether a fragment can lead ("link") to another fragment during the operation of the application. For example, assuming fragments 5 and 6 can be accessed via fragment 4, the fragments relationship data structure 320 can includes information that fragment 4 can lead to fragments 5 and 6.

Fragments relationship data structure 320 can further include a fragment likelihood indicator 325. The fragment likelihood indicator 325 can indicate the likelihood that a selected next fragment will follow a previous fragment. For example, assuming fragments 5 and 6 can be accessed via fragment 4, the fragments relationship data structure 320 can include fragment likelihood indicator 325, which indicates the likelihood that fragment 5 will follow fragment 4 and the likelihood that fragment 6 will follow fragment 4. Using emulator 310 to simulate the application, the simulation determines that fragment 5 follows fragment 4 eighty percent of the time, and that fragment 6 follows fragment 4 twenty percent of the time.

By comparing the fragment likelihood indicator 325 for fragment 5 to the fragment likelihood indicator 325 for fragment 6, it can be determined that fragment 5 is much more likely that fragment 6 to follow fragment 4. The fragment likelihood indicator 320 for fragment 5 is set to 0.8, and the fragment likelihood indicator 320 for fragment 6 is set to 0.2. In some embodiments, fragments relationship data structure 320 does not contain fragment likelihood indicator 325 and fragment likelihood indicator 325 is contained in a different data structure. In an embodiment, fragment likelihood indicator 325 is determined based on code analysis rather than emulation.

The application fragmentation analyzer 300 can further generate a resource dependency data structure 330. The resource dependency data structure 330 includes information regarding the resources needed for running each fragment of the application. The resources can include images, icons, texts, audios, videos, 3D models, or other data included in the application. For instance, if a fragment 3 of the application needs to display an image A and play an audio clip B during the operation of the fragment 3 of the application, the resource dependency data structure 330 includes information that fragment 3 needs the image A and audio clip B.

Based on the information in the fragments relationship data structure 320 and the resource dependency data structure 330, the application fragmentation analyzer 300 can generate the fragments of the application in a fragments store 340. The fragments store 340 includes all the fragments of the application. In one embodiment, each specific fragment can include the resources that the specific fragment needs. In another embodiment, a fragment does not include all resources that the fragment needs. When the fragment is transmitted to a computing device, the corresponding resources are transmitted along with the fragment according to the resource dependency data structure 330.

The application fragmentation analyzer 300 decomposes an application into fragments. A computing device can download enough fragments to run the application at the current status, instead of downloading the entire application.

The computer device can further download and cache the fragments that would possibly follows the fragment currently running.

The application fragmentation analyzer 300 automatically determines the fragments of the application, without human intervention. The developer of the application does not need to do any extra work for decomposing the application into fragments. The application fragmentation analyzer 300 automatically determines the fragments based on the flow of the application and the resources dependency information.

In some other embodiments, the application fragmentation analyzer can be used by as a crowd sources device processing. Computing devices that have the full application or a portion of the application stored locally can use the application fragmentation analyzer to determine the user interfaces and resources for each fragment of the application. Then the fragmenting information can be updated to a server so that the server can decompose the application on the server accordingly and streams the fragments to the next requesting computing device. The computing device does not need to determine all fragments of the application. A first computing device can just determine a portion of the application that it has run locally into fragments. This fragmenting information is collected to the server. A second computing device can stream the fragments and may possibly run an even larger portion of the application. The second computing device can generate additional fragments that the first computing device does not generate. Collectively, computing devices can generate the fragments of the application so that the server just needs to use the fragmenting information to stream the fragments to a device that requests the application in the future.

In one embodiment, the fragments of the application can be in native code format for the operating system of the computing device. In another embodiment, the fragments can be in an interpretative or markup language such as HTML5 (HyperText Markup Language 5).

In one embodiment, the operating system of the computing device includes a fragment module to process and execute the fragments. For instance, when a fragment of an application ends the operation of the fragment and leads to another fragment, the fragment module can immediately stops and cleans up the fragment, and starts running the other fragment. In another embodiment, the computing device runs a launcher program to manage the operations of the fragments of the application. For instance, the launcher program can determine that a running fragment now leads to another fragment, and accordingly starts launching the other fragment immediately.

The fragments can have different versions specifically for different types of client devices. For instance, the fragments can have both English and Chinese versions of the fragments, designed for computing devices with English or Chinese language preference, respectively. The fragments can have different versions for different types of devices, different operating systems, or different mobile operator. For instance, the fragments of an application can have two different versions designed for Android tablets running on Verizon mobile network, and iPhone smart phones running on AT&T mobile network, respectively.

The downloading and caching of the fragments can be dynamically determined by various factors of the computing device. The computing device can monitor the operation of the currently running fragments and predict the next possible fragments to be cached. The computing device can adjust the fragments streaming queue based on the current network transferring speed and the workload of the computing device.

In some embodiments, the computing device can purge ("delete") the fragments that have already been executed and are no longer needed for the current and future operation of the application. This saves the storage space and the computing device and can increase the cache space for caching the incoming fragments for potential future operation of the application.

Figure 4:
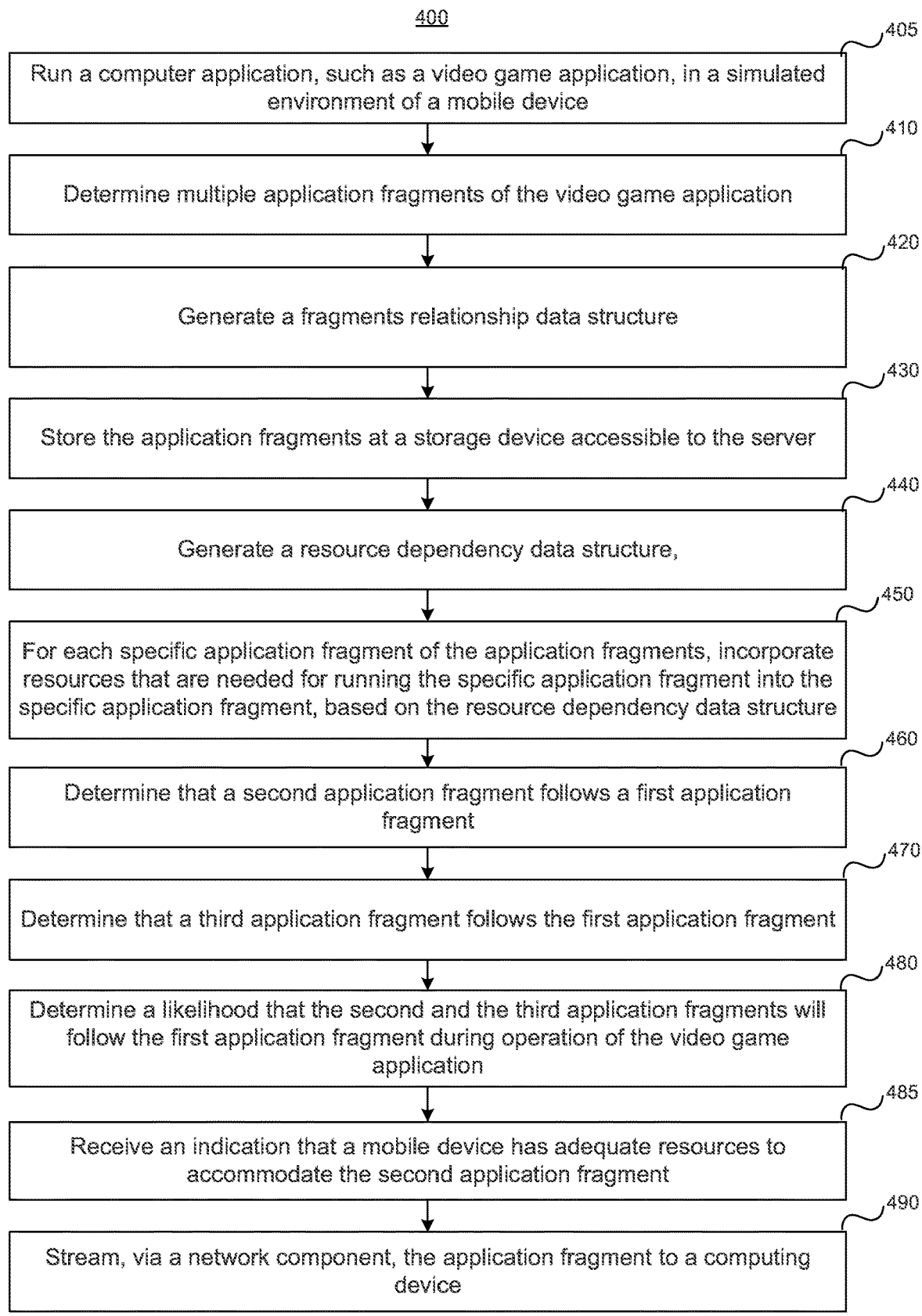
FIG. 4 illustrates an example of an application fragmentation process.

FIG. 4 illustrates an example of an application fragmentation process. The process 400 can be performed by a server, or a computing device as a part of the crowd sourced processing. Any of the steps of the process 400 can be crowd sourced, and crowd sourcing a step or task can be substantially similar to the crowd souring a task process that is described above in description of FIG. 3. Although in the embodiment illustrated in FIG. 4, steps are performed by a server, the steps can also be performed by a computing device. At step 405 of the process 400, the server runs a computer application in a simulated environment of a mobile device. The computer application of the example of FIG. 4 is a video game application. At step 410, by running the video game application in the simulated environment, the server determines multiple application fragments of a video game application. Each application fragment of the application fragments includes a code to present at least one interface of the video game application.

At step 420, the server generates a fragments relationship data structure. The fragments relationship data structure includes identifications of application fragments that leads to another application fragment of the application fragments. An application fragment can have multiple next application fragments. For example, a user may be in an application fragment corresponding to a first level of a video game. In one situation, the user advances to a second level of the video game, and the application fragment corresponding to the second level begins to run. In another situation, the user clicks a help button while in the first level application fragment, and the application fragment corresponding to a help system begins to run. In this example, both the second level application fragment and the help system application fragment are next application fragments to the first level application fragment.

At step 430, the server stores the application fragments at a storage device within the server.

At step 440, the server generates a resource dependency data structure, wherein for each specific application fragment of the application fragments, the resource dependency data structure includes identifications of resources that are needed for running the specific application fragment. The resources can include images, icons, texts, audios, videos, 3D models, or other data included in the video game application.

In one embodiment, at step 450, for each specific application fragment of the application fragments, the server incorporates resources that are needed for running the specific application fragment into the specific application fragment, based on the resource dependency data structure. In another alternative embodiment, the resources are not incorporated in the fragments. Instead, the server streams, via the network component, resources that are needed for running the application fragment to the computing device, based on the resource dependency data structure.

At step 460, the server determines that a second application fragment follows a first application fragment. In an embodiment, the server accesses the fragments relationship data structure to determine that the second application fragment follows the first application fragment. In another embodiment, the server sends the fragments relationship data structure to a computing device, for example a mobile device. The mobile device accesses the fragments relationship data structure to determine that the second application fragment follows the first application fragment. The mobile device sends a request for the second application fragment to the server based on the determination that the application fragment follows the first application fragment. The server determines that the second application fragment follows the first application fragment by receiving the request for the application fragment.

At step 470, following a process similar to step 460, the server determines that a third application fragment follows a first application fragment.

At step 480, the server determines a likelihood that the second and the third application fragments will follow the first application fragment during operation of the video game application. In an embodiment, the server determines the likelihood by accessing a data structure containing a fragment likelihood indicator, such as fragment likelihood indicator 325 of FIG. 3. In an embodiment, the server determines the likelihood by receiving a request for either the second or the third application fragments from a computing device. The computing device, in an embodiment running an intermediary application, determines the likelihood by accessing a data structure containing a fragment likelihood indicator, such as fragment likelihood indicator 325 of FIG. 3.

Based on the fragment likelihood indicator, for example when a comparison of the fragment likelihood indicator of the second application fragment and the fragment likelihood indicator of the third application fragment indicate that the second application fragment is more likely to be the next application fragment, the computing device requests the second application fragment from the server. The server determines that the second application fragment is more likely the next application fragment based on receiving the request for the second application fragment, the computing device having sent the second application fragment based on the determination of the computing device that the second application fragment is more likely than the third application fragment to be the next application fragment.

At step 485, the server receives an indication that a mobile device has adequate resources to accommodate an application fragment. In an embodiment, the mobile device determines that it has adequate resources to accommodate the application fragment. The mobile device determines its available resources, determines the resource requirements of the application fragment, and compares the available resources to the required resources to determine if the mobile phone has adequate resources to accommodate the application fragment. The mobile device sends a request for the application fragment to the server based on the determination that it has adequate resources to accommodate the application fragment. The server determines that the application fragment follows the first application fragment by receiving the request for the application fragment.

In an embodiment, the mobile device determines its available resources, and sends resource information including information regarding its available resources to the server. The resource information indicates that the mobile device has adequate resources to accommodate the application fragment, in that the resource information indicates an amount of available resources in excess of the resources required by the application fragment. The server determines the mobile device's available resources based on the mobile device's resource information, determines the resource requirements of the application fragment, and compares the mobile device's available resources to the required resources to determine if the mobile phone has adequate resources to accommodate the application fragment.

At step 490, the server streams, via a network component, the application fragment of the application fragments to a computing device, wherein the application fragment can potentially follow another application fragment currently running on the computer device based on the fragments relationship data structure. In an embodiment, the application fragment is streamed based on the indication of step 485 that the mobile device has adequate resources to accommodate the second application fragment, and based on the fragments relationship data structure indicating that the second application fragment follows the first application fragment during operation of the video game application, as determined in step 460. In an embodiment, the application fragment is streamed based on the determined likelihood of step 480 that the application fragment is more likely that another application fragment to be the next application fragment.

Figure 5:
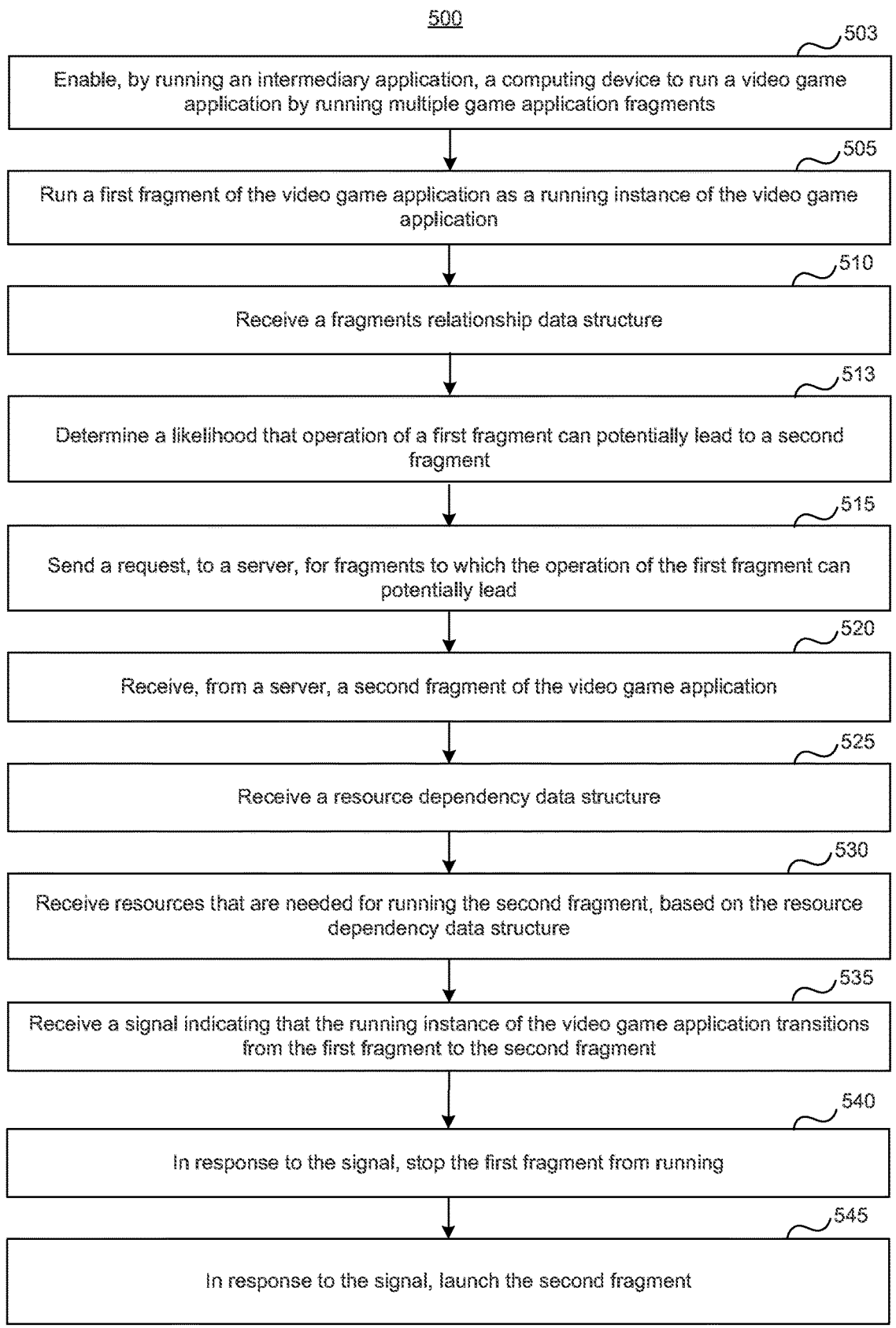
FIG. 5 illustrates an example of a process for receiving and running fragments of an application.

FIG. 5 illustrates an example of a process for receiving and running fragments of an application. At step 503, a computing device is enabled, by running an intermediary application, to run a computing application by running multiple game application fragments. In the example of FIG. 5, the computing application is a video game application. The intermediary application can be a container application, such as the container application discussed in the description of step 545. The intermediary application can act as an intermediary application between the video game application and application fragments by, for example: managing, launching, and/or closing the fragments of the video game application; controlling the computing device to execute the first application fragment; controlling the computing device to execute the first application fragment within the intermediary application; sending a command to the operating system of the computing device to execute the first application fragment; and/or determining the next application fragment that potentially follows the first application fragment, based on a fragments data structure; among others.

At step 505 of the process 500, the computing device runs a first fragment of the video game application as a running instance of a video game application. At step 510, the computing device receives a fragments relationship data structure. The fragments relationship data structure includes identifications of fragments that leads to another fragment of the video game application. In an embodiment, the fragments relationship data structure need not be sent to the computing device. A server uses the fragments relationship data structure to determine fragments to which a first fragment can potentially lead. The server sends a second fragment to the computing device based on the fragments relationship data structure indicating that the second fragment follows the first fragment during operation of the application.

At step 513, the computing device determines a likelihood that the operation of the first fragment can potentially lead to a second fragment during operation of the video game application. When the first fragment leads to only a second fragment, the likelihood is one hundred percent that the first fragment will lead to the second fragment. In an embodiment where the first fragment can lead to multiple next fragments, such as to the second and a third application fragment, the computing device determines the likelihood by accessing a data structure containing a fragment likelihood indicator, such as fragment likelihood indicator 325 of FIG. 3. In an embodiment where the first application fragment can lead to the second application fragment and the third application fragment, the computing device determines the likelihood by receiving either the second or the third application fragments from server. The server determines the likelihood by accessing a data structure containing a fragment likelihood indicator, such as fragment likelihood indicator 325 of FIG. 3.

Based on the fragment likelihood indicator, for example when a comparison of the fragment likelihood indicator of the second application fragment and the fragment likelihood indicator of the third application fragment indicate that the second application fragment is more likely to be the next application fragment, the server prioritizes and sends the second application fragment to the computing device. The computing device determines that the second application fragment is more likely the next application fragment based on receiving the second application fragment, the server having sent the second application fragment based on the server's determination that the second application fragment is more likely than the third application fragment to be the next application fragment.

At step 515, the computing device sends a request, to a server, for fragments to which the operation of the first fragment can potentially leads. As discussed related to step 420 of FIG. 4, an application fragment can have multiple next application fragments. In one example, the computing device is running a first fragment, and the first fragment can lead to a second fragment and a third fragment, each respectively at different times of operation. The computing device, while running the first fragment, requests and receives both the second and third fragments. The operation of the application in this instance leads to the third fragment, and does not lead to the second fragment. The computing device deletes the second fragment without having run the second fragment. Further, as discussed related to step 485 of FIG. 4, the request for the fragment can be based on a determination that the device has adequate resources to accommodate a fragment.

At step 520, the computing device receives, from a server, a second fragment of the video game application, wherein operation of the first fragment can potentially leads to the second fragment.

At step 525, the computing device receives a resource dependency data structure. The resource dependency data structure includes identifications of resources that are needed for running fragments of the video game application. At step 530, the computing device receives resources that are needed for running the second fragment, based on the resource dependency data structure. Alternatively, in some other embodiments, the second fragment itself includes resources that are needed for running the second fragment.

At step 535, the computing device receives a signal indicating that the running instance of the video game application transitions from the first fragment to the second fragment. At step 540, in response to the signal, the computing device stops the first fragment from running. At step 545, in response to the signal, the computing device launches the second fragment.

In some other embodiments, a computing device can run a container application responsible for managing, launching and closing the fragments of a video game application. The computing device receives a first fragment of the video game application from a server. Under the control of the container application, the computer device executes the first fragment. The container application can executes the first fragment within the container application itself; or the container application send commands to the operating system of the computing device to execute the first fragment.

Either the container application or the server determines the next fragment that potentially follows the first fragment. In one embodiment, the container application determines a second fragment of the video game application that follows the first fragment, based on a fragments relationship data structure; then the container application requests and receives the second fragment of the video game application from the server. In another embodiment, the container application generates and sends a request to the server for fragments to which an operation of the first fragment can potentially leads; then receives a second fragment determined by the server.

When the first fragment of the video game application ends its execution, the container application launches the second fragment accordingly to continue the execution of the video game application. Therefore, under the control of the container application, the video game application can run seamlessly on the computer device without the need that all fragments of the video game application has to be downloaded to the computing device. The container application can further delete ended fragments (e.g. the first fragment) from the computing device to save local storage space.

Figure 6:
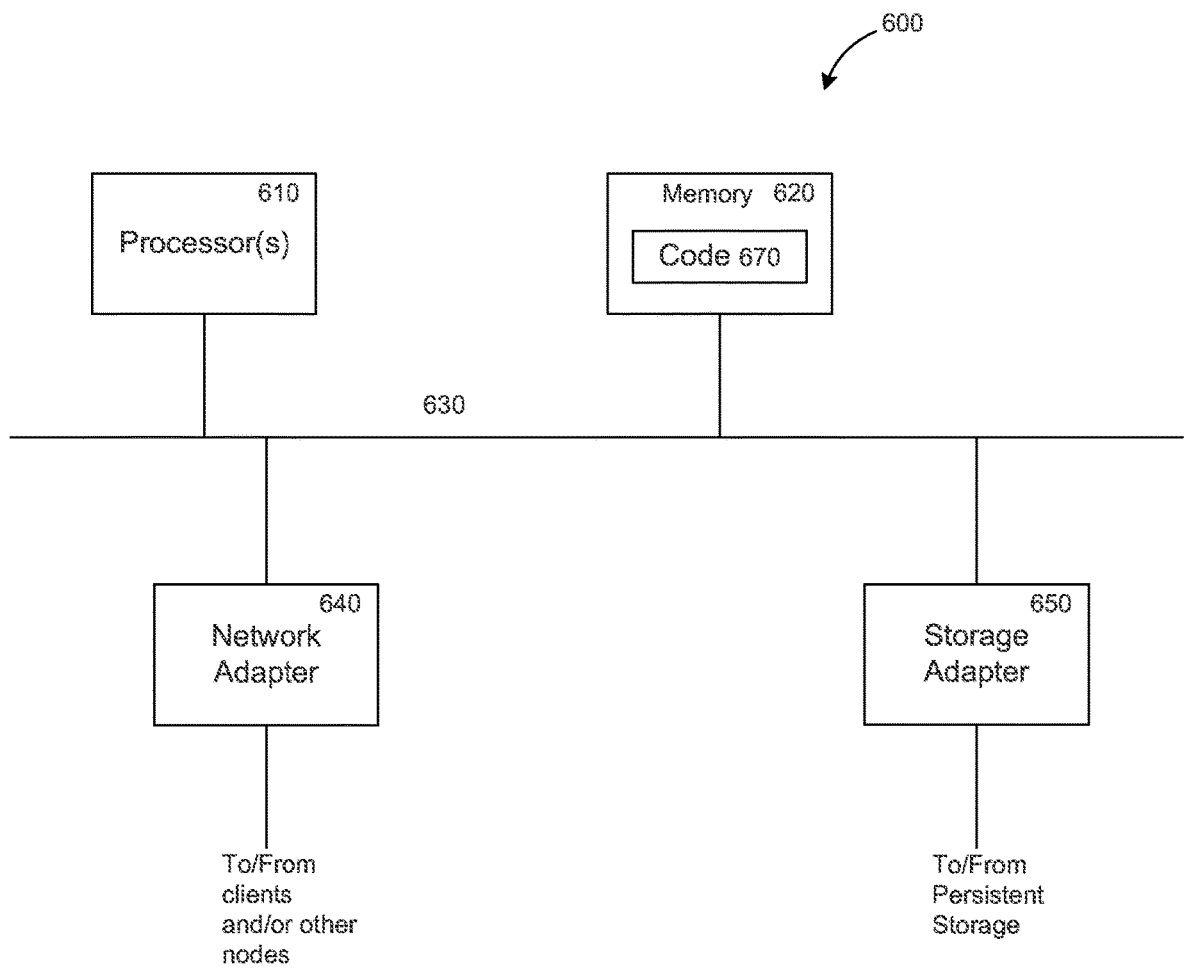
FIG. 6 is a high-level block diagram showing an example of the architecture of a computer, which may represent any computing device or server described herein.

FIG. 6 is a high-level block diagram showing an example of the architecture of a computer 600, which may represent any computing device or server described herein. The computer 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may contain a code 670 containing instructions according to the technology disclosed herein.

Also connected to the processor(s) 610 through the interconnect 630 are a network adapter 640 and a storage adapter 650. The network adapter 640 provides the computer 600 with the ability to communicate with remote devices, over a network and may be, for example, an Ethernet adapter or Fibre Channel adapter. The network adapter 640 may also provide the computer 600 with the ability to communicate with other computers. The storage adapter 650 allows the computer 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A server comprising:
a processor;
a network component, coupled to the processor, through which to communicate over a network with remote devices; and
a storage device coupled to the processor, the storage device storing instructions which, when executed by the processor, cause the server to perform operations including:
sending one or more messages to cause execution of a crowd sourced compute task at a plurality of computing devices, the crowd sourced compute task including execution of a plurality of computer simulations at the plurality of computing devices that includes running a mobile game application on respective mobile device emulators that simulate the mobile game application running on an environment of a selected mobile device to determine application fragments of the mobile gaming application;
collecting fragment information associated with a plurality of the application fragments determined as a result of the crowd sourced compute task, the plurality of application fragments including a first application fragment and a second application fragment, wherein each application fragment of the plurality of application fragments corresponds to a portion of the mobile game application;
storing the fragment information at the storage device;
receiving, from a mobile device, an indication to stream the first application fragment;
streaming, via the network component, the first application fragment to the mobile device in response to the indication to stream the first application fragment;
determining that the second application fragment follows the first application fragment based on a fragments relationship data structure, the fragments relationship data structure associating the first application fragment with the second application fragment, based on an analysis of the fragment information that indicates that the second application fragment follows the first application fragment during operation of the mobile game application; and
streaming, via the network component, the second application fragment to the mobile device based on the determination that the second application fragment follows the first application fragment.

2. The server of claim 1, wherein the first application fragment corresponds to a first user interface that corresponds to displaying a first level of the mobile game application, wherein the second application fragment corresponds to a second user interface that corresponds to displaying a second level of the mobile game application, and wherein the second application fragment follows the first application fragment in response to a transition from the first level of the mobile game application to the second level of the mobile game application.

3. The server of claim 1, wherein the first application fragment corresponds to a first scene in the mobile game application, wherein the second application fragment corresponds to a second scene in the mobile game application, and wherein the second application fragment follows the first application fragment in response to a transition from the first scene to the second scene.

4. The server of claim 1, wherein the first application fragment is determined based on an analysis of a first user interface by running the mobile game application on the mobile device emulator that simulates the mobile game application running on the environment of the selected mobile device, to determine resources for displaying the first user interface on the selected mobile device.

5. A method comprising:
in response to an indication to initiate a crowd sourced compute task, sending one or more messages to initiate execution of the crowd sourced compute task at a plurality of computing devices, the crowd sourced compute task including execution of a plurality of computer simulations at the plurality of computing devices that includes running a mobile entertainment application on respective mobile device emulators that simulate the mobile entertainment application running on an environment of a selected mobile device to determine a plurality of application fragments of the mobile entertainment application, including a first application fragment and a second application fragment, wherein each application fragment of the plurality of application fragments corresponds to a portion of the mobile entertainment application;
receiving fragment information associated with the plurality of application fragments;
storing the fragment information at a storage device;

determining that the second application fragment follows the first application fragment based on a fragments relationship data structure, the fragments relationship data structure associating the first application fragment with the second application fragment based on an analysis of the fragment information that indicates that the second application fragment follows the first application fragment during operation of the mobile game application;

receiving, from a mobile device, an indication to stream the first application fragment;

in response to the indication to stream the first application fragment, streaming, via a network component, the first application fragment to the mobile device for execution by the mobile device;

receiving, from the mobile device, an indication that the execution of the first application fragment is to transition to another application fragment; and streaming, via the network component, the second application fragment to the mobile device based on an analysis of the fragment information that indicates that the second application fragment follows the first application fragment during operation of the mobile game application.

6. The method of claim 5, wherein the storage device is provided as part of a cloud storage service.

7. The method of claim 5, further comprising:
receiving, from the mobile device, resource information indicating that the mobile device has adequate resources to accommodate the second fragment.

8. The method of claim 5, wherein the plurality of application fragments include multiple versions.

9. The method of claim 8, wherein the multiple versions include an Android environment version and an iOS environment version.

10. A non-transitory computer-readable medium storing computer executable code, comprising instructions for:
sending one or more messages to cause execution of a crowd sourced compute task at a plurality of computing devices, the crowd sourced compute task including execution of a plurality of computer simulations at the plurality of computing devices that includes running a mobile game application on respective mobile device emulators that simulate the mobile game application running on an environment of a selected mobile device to determine application fragments of the mobile gaming application;

collecting fragment information associated with a plurality of the application fragments determined as a result of the crowd sourced compute task, the plurality of application fragments including a first application fragment and a second application fragment, wherein each application fragment of the plurality of application fragments corresponds to a portion of the mobile game application;

storing the fragment information at a storage device;

receiving, from a mobile device, an indication to stream the first application fragment;

streaming the first application fragment to the mobile device in response to the indication to stream the first application fragment;

determining that the second application fragment follows the first application fragment based on a fragments relationship data structure, the fragments relationship data structure associating the first application fragment with the second application fragment, based on an analysis of the fragment information that indicates that the second application fragment follows the first application fragment during operation of the mobile game application; and streaming the second application fragment to the mobile device based on the determination that the second application fragment follows the first application fragment.

11. The non-transitory computer-readable medium of claim 10, wherein the first application fragment corresponds to a first user interface that corresponds to displaying a first level of the mobile game application, wherein the second application fragment corresponds to a second user interface that corresponds to displaying a second level of the mobile game application, and wherein the second application fragment follows the first application fragment in response to a transition from the first level of the mobile game application to the second level of the mobile game application.

12. The non-transitory computer-readable medium of claim 10, wherein the first application fragment corresponds to a first scene in the mobile game application, wherein the second application fragment corresponds to a second scene in the mobile game application, and wherein the second application fragment follows the first application fragment in response to a transition from the first scene to the second scene.

13. The non-transitory computer-readable medium of claim 10, wherein the first application fragment is determined based on an analysis of a first user interface by running the mobile game application on the mobile device emulator that simulates the mobile game application running on the environment of the selected mobile device, to determine resources for displaying the first user interface on the selected mobile device.

* * * * *